Aug. 25, 1953
J. W. MORSE ET AL
2,649,908
ENGINE CONTROL SYSTEM FOR
AUTOMOTIVE VEHICLES
Filed May 29, 1951
2 Sheets-Sheet 1
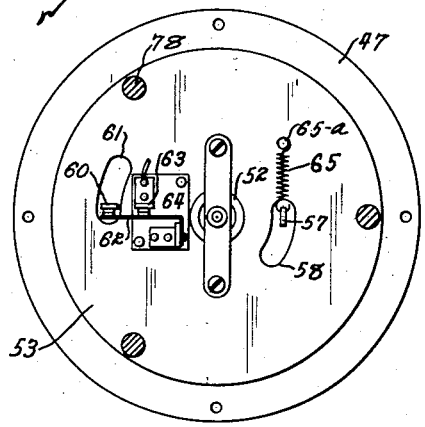
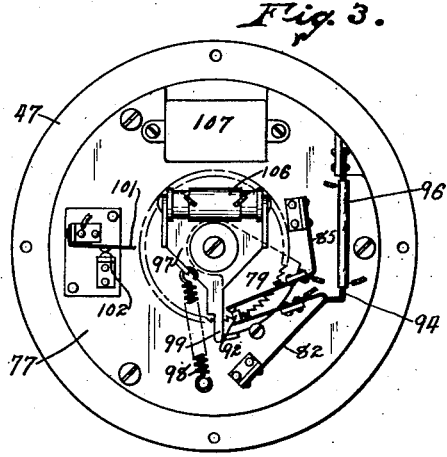
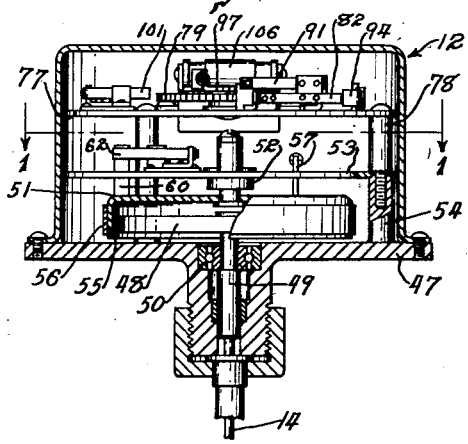
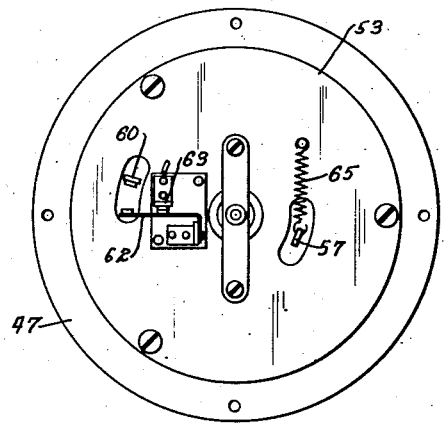
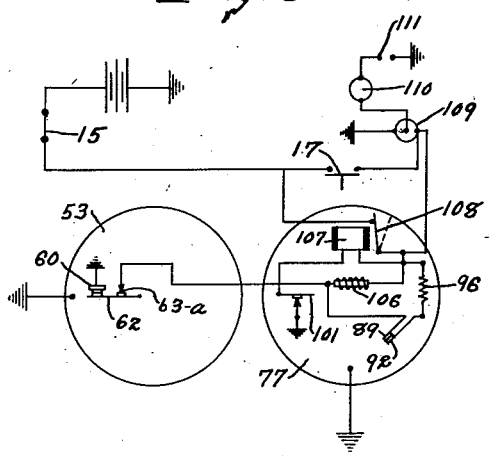
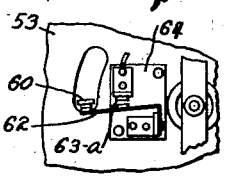
INVENTOR.
JOHN W. MORSE
SELWYN P. MILES
BY RICHARD H. BELL
Louis V. Lucia
ATTORNEY.

Aug. 25, 1953

J. W. MORSE ET AL
ENGINE CONTROL SYSTEM FOR
AUTOMOTIVE VEHICLES 2,649,908

Filed May 29, 1951

INVENTOR.
JOHN W. MORSE
SELWYN P. MILES
BY RICHARD A. BELL

Louis V. Lucia
ATTORNEY

Patented Aug. 25, 1953

2,649,908

UNITED STATES PATENT OFFICE 2,649,908

ENGINE CONTROL SYSTEM FOR AUTOMOTIVE VEHICLES

John W. Morse, Glastonbury, Selwyn P. Miles, Wethersfield, and Richard A. Bell, Yalesville, Conn., assignors, by mesne assignments, to Titeflex, Inc., Newark, N. J., a corporation of Massachusetts Application May 29, 1951, Serial No. 228,946

8 Claims. (Cl. 161—1)

This invention relates to an engine control system for automotive vehicles and is a division of our co-pending parent application entitled "A Speed and Engine Control System for Automotive Vehicles," Serial No. 219,816, filed April 7, 1951.

This application is directed to that portion of the invention which has as its object the provision of means for automatically timing the idle running of the engine and shutting off the ignition thereof when the engine has run idle for a predetermined period of time.

A further object of this invention is the provision of an idle control unit whose operation is initiated when the vehicle comes to a stop.

Further objects and advantages of this invention will be more clearly understood from the following description and the accompanying drawings in which:

Fig. 1 is a plan view of the engine control unit, in section on line 1—1 of Fig. 2, with the cover removed therefrom to illustrate the control switch in closed position.

Fig. 2 is a side view of said unit partly in central vertical section.

Fig. 3 is a plan view of the unit with the cover removed illustrating the idle control mechanism.

Fig. 4 is a view similar to Fig. 1, but showing the control switch in one of its open positions.

Fig. 5 is a diagrammatic view illustrating the electrical circuit for the control unit.

Fig. 6 is a fragmentary plan view, similar to Fig. 4, illustrating the control switch in another of its open positions.

Figure 7:
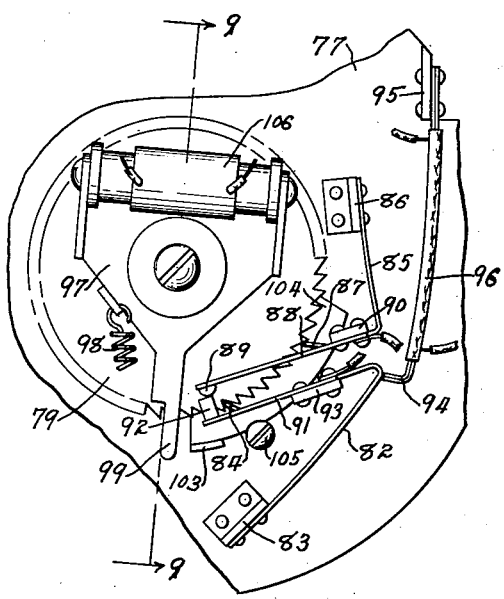
Fig. 7 is an enlarged fragmentary plan view illustrating the operation of the mechanism for the idle control unit.

In the embodiment of the present invention as illustrated in the drawings, our improved system includes a speed responsive device, generally indicated at 12, which is preferably mounted upon the fire-wall of the vehicle and is driven by a flexible shaft 14 in the same manner as the conventional speedometer, and as fully described in the above mentioned parent application.

The electric circuit used in said system is preferably connected in series with the conventional ignition switch 15 which is usually mounted upon the instrument panel of the vehicle and includes a key operated lock mechanism. The said circuit may also include a manually operable reset switch 17 which is preferably located adjacent to the switch 15.

The speed responsive device 12 comprises a base 47 having a magnetic rotor 48 mounted thereon that is secured to a shaft 49 which is rotatably mounted in a bearing 50 and is driven by means of the flexible shaft 14. An inverted drag cup 51, of non-ferrous material, is rotatably mounted in a bearing 52 upon a supporting plate 53 which is mounted upon posts 54 extending from the base 47. The said cup has an annular flange 55 which surrounds the rotor 48 and the said flange contains a ferrous band 56 which provides a low reluctance path for the flux lines eminating from the rotor 48 and passing from the non-ferrous cup. The current induced in the non-ferrous cup by the passage of these lines produces a torque proportionate to the speed of the rotor, which corresponds to the speed of the vehicle, and rotates the cup 51.

The said cup 51 carries a post 57 which extends through an opening 58 in the plate 53 and has secured thereto a light spring 65 which is anchored to a stationary pin 65-a on the plate 53 and resists the rotation of the drag cup 51. The said spring retains the mechanism in the position illustrated in Fig. 1 when the vehicle is stationary. The said cup, which is electrically grounded to the vehicle, also carries a switch post 60 that extends upwardly through an opening 61 in the plate 53 and engages a double contact flexible switch bar 62 which also contacts a switch post 63 that is mounted upon an insulating base 64 carried on the plate 53.

The timing mechanism for controlling the idling of the engine in accordance with the present invention is also contained within the unit 12. This mechanism is carried upon a supporting plate 77 which is mounted upon posts 78 that are threaded into the posts 54 as clearly illustrated in Fig. 2. The mechanism comprises a ratchet disc 79 which is rotatably mounted upon a stud 80 that is secured to the plate 77 and has a series of ratchet teeth 81 around the periphery thereof. A V-shaped spring bar 82 is anchored upon an upright post 83, which extends from the plate 77, and has a pawl 84 at its free end which engages the teeth 81 and rotates the disc 79 in a manner to be hereinafter described. A spring bar 85 is anchored upon an upright post 86, which is also secured to the plate 77, and the said spring bar has a dog 87 at the free end thereof which engages the teeth 81.

A switch bar 88, which has a contact point 89, is carried on an insulating block 90 that is secured to the bar 85, and a cooperating switch bar 91, which has a contact point 92, is carried on an insulating block 93 that is secured to the bar 82.

The pawl 84 is operated by means of a bi-metal bar 94 that is anchored upon an upright post 95, which is bent upwardly from the plate 77, and the said bi-metallic bar has its free end in engagement with the apex of the bar 82. The bi-metallic bar 94 is heated by means of an electric resistance element 96 which is controlled by an electric switch consisting of the switch bars 88 and 91 as will be hereinafter more fully described. A plate 97 is provided over the ratchet disc 79, and the said plate is rotatable on the stud 80 independently of the said ratchet disc. This plate is normally urged in a counter-clockwise direction by means of a spring 98 that is anchored to the plate 77. The said plate 97 has an operating finger 99 which extends therefrom and is adapted to operate a normally closed stop switch 100 by engagement with the movable contact bar 101 thereof that is insulated from the plate 77. The said switch 100 also includes the stationary contact member 102 which is grounded to the plate 77. The operating finger 99 is adapted to engage a stop 103 which projects from a plate 104 that is adjustably pivoted on the stud 80 and is retained in adjusted position by a clamping screw 105. The plate 97 carries a magnetic coil 106 thereon that is controlled by the switch 62 through a relay 107 which operates an electric switch 108 as will be hereinafter fully described.

The operation of the idling time control mechanism above described is as follows:

In order to complete the ignition circuit of the engine, which, as illustrated in Fig. 5, includes the spark coil 109, the distributor 110 and the spark plugs indicated at 111, and initiate the operation of the control mechanism, it is necessary to close the switch 15 and also to momentarily close the reset switch 17. The closing of said reset switch will cause energization of the holding relay 107 to thereby close the switch 108 which forms a part of said relay. It will be noted that once the relay has been energized, it will remain in that condition until the switch 100 is opened by the finger 99. The closing of the said switch 108 will complete the circuit through the magnetic coil 106, the resistance element 96, the normally closed switch formed by the contacts 89 and 92 and the normally closed switch 62, and thereby initiate the operation of the idling control. After the switch 108 has closed, the engine may be started in the normal manner.

Figure 8:
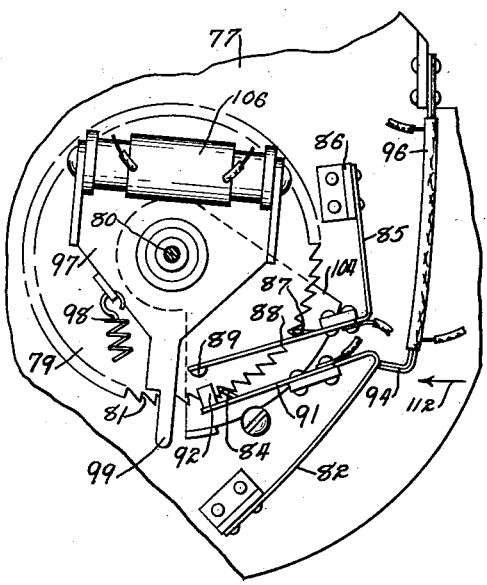
Fig. 8 is a similar view, but showing the mechanism in a different position.
Figure 9:
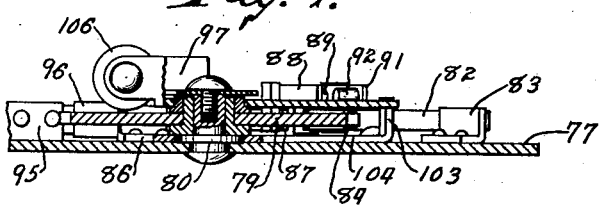
Fig. 9 is a sectional view on line 9—9 of Fig. 7.
Figure 10:
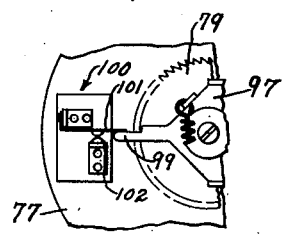
Fig. 10 is a fragmentary plan view of a portion of the mechanism illustrating the position thereof as the ignition circuit is cut off.

Energization of the magnetic coil 106 will cause it to adhere to the ratchet disc 79 and thereby secure the plate 97 to said disc. Energization of the resistance 96, through the switch which includes the contacts 89 and 92, will cause the said resistance to heat the bi-metal bar 94 which will then flex in the direction of the arrow 112. This will flex the spring bar 82 and cause the pawl 84 to rotate the disc 79 in a clockwise direction. As the said disc is rotated for the distance of one of the teeth 81, the dog 87 will escape over the tip of the tooth which it is engaging and drop down into the next tooth and thereby move the switch bar 88 away from the switch bar 91 and separate the contacts 89 and 92, as shown in Fig. 8, and open the switch. This will de-energize the resistance element 96 and cause the bar 94 to cool and move in the opposite direction and thereby permit reverse movement of the pawl 84. When the said pawl escapes over the tip of the tooth against which it is moving, it drops down toward the switch bar 88 and causes the contact 92 to move into engagement with the contact 89 as shown in Fig. 3. This will again energize the element 96, heat the bi-metallic bar 94 and cause operation of the pawl 84 to rotate the disc 79 for the distance of another tooth. The successive opening and closing of the switch and the resulting heating and cooling of the bar 94, which is caused by the energization and de-energization of the resistance 96, will cause the disc 79 to rotate step by step until the finger 99 on the plate 97, which has been secured to the disc 79 by the magnetic coil 106 throughout the entire movement of said disc, engages the movable contact bar 101 and separates said bar from the contact member 102 as shown in Fig. 10. This opens the normally closed stop switch 100 and breaks the electric circuit to the relay 107 and de-energizes said relay. The switch 108 will then return to its normally open position and break the circuit to the ignition system and thereby stop the engine. The opening of the switch 108 will de-energize the magnetic coil 106 to thereby release the plate 97 from the disc 79 and permit the spring 98 to return the plate to normal position wherein the finger 99 is returned to the stop 103.

It is noted that the time period provided by the rotation of the disc 79 for carrying the finger 99 into engagement with the switch bar 101 is preferably about three minutes, but this may be varied as desired by the adjustment of the plate 104 which will vary the distance between the stop 103 and switch bar.

It will also be noted that the control mechanism will operate even if the engine has not been started after the reset switch 17 has been closed since it is the ignition circuit which is controlled by the mechanism and not the starter circuit.

The operation above described for the idling control mechanism occurs when the engine has been permitted to run idle the full period of time for which the mechanism is adjusted. This will prevent excessive idle running of the engine, such as when the operator of the vehicle leaves with the intention of returning promptly and then is detained. If the operator returns before the expiration of the said time period and moves the vehicle forwardly, such movement of the vehicle will cause rotation of the cup 51 by the rotor 48 and thereby move the switch post 60 in a direction away from the switch blade 62, as shown in Fig. 4, and thereby open the electric circuit and de-energize only the magnetic coil 106 and the resistance 96. This will return the timing mechanism to its normal position, but permit the relay 107 to remain energized and maintain the switch 108 closed so as to retain the circuit through the ignition system closed to permit the operation of the engine. It will be noted that movement of the vehicle at the rate of two or three miles per hour is sufficient to move the switch post 60 and cause de-energization of the magnet, since the rotation of the cup is opposed only by the very light spring 65.

It will be understood from the above description that the operation of the timing mechanism will be initiated when the ignition and reset switches 15 and 17, respectively, are closed and also when the vehicle comes to a stop while the engine is still running since this causes the closing of the circuit by means of the contact between the switch post 60 and the bar 62 and thereby causes energization of the magnet 106 and the resistance 96. However, the said timing mechanism will always start from the normal position since any elapsed time from the previous time period will be cancelled upon movement of the vehicle, through the operation of the switch post 60 as above stated, and upon opening of the circuit by means of the ignition switch.

The return of the said timing mechanism to its normal condition and the cancellation of the elapsed time will also be caused when the vehicle is moved in a rearward direction before the full predetermined time period has expired. This is caused by reason of the cup 51 being rotated in a reverse direction through the reverse rotation of the rotor 48 and the movement of the bar 62 by the post 60 which will cause said bar to disengage the normally closed contacts 63-a, as shown in Fig. 6, and thereby break the circuit and return the timing mechanism to its normal condition in the same manner as when the vehicle is moved in a forward direction.

It will thus be seen that our invention provides a completely automatic idle control which is set into operation when the vehicle comes to a stop and is not actuated by the accelerator linkage or other apparatus which is under the control of the operator as in the case of timing devices heretofore employed.

We claim:

1. A system for controlling the engine of an automotive vehicle including an electric circuit for the ignition of said engine, a relay for controlling said circuit, electrically operable timing means in said circuit, a reset switch for energizing the relay to close the circuit and thereby energize the ignition and the timing means, a switch operable by said timing means at the expiration of a predetermined period of time to de-energize said relay and break the circuit and stop the engine and said timing means, and a separate switch responsive to movement of the vehicle for rendering said timing means inoperative independently of the ignition.

2. A system for controlling the engine of an automotive vehicle comprising an electric circuit including a manually operable switch for closing the circuit, electrially operable timing means in said circuit, a relay for controlling said circuit, a reset switch for energizing the relay to close the circuit and thereby energize the ignition and the timing means, a separate switch operable by said timing means at the expiration of a predetermined period of time for de-energizing the relay to thereby break the circuit and stop the engine, a control switch in said circuit for controlling the timing means independently of the ignition and means for operating said control switch to energize said timing means upon the stopping of the vehicle while the engine is running.

3. A system for controlling the engine of an automotive vehicle comprising an electric circuit including a manually operable switch for closing the circuit, electrially operable timing means in said circuit, a relay for controlling said circuit, a reset switch for energizing the relay to close the circuit and thereby energize the ignition and the timing means, a separate switch operable by said timing means at the expiration of a predetermined period of time for de-energizing the relay to thereby break the circuit and stop the engine, a normally closed double switch in said circuit including two sets of contacts for controlling the timing means independently of the ignition, and means responsive to the movement of the vehicle for operating said double switch; the said means being operable to open one set of the contacts of said double switch upon forward movement of the vehicle and the other set of contacts upon rearward movement of the vehicle.

4. A system for controlling the engine of an automotive vehicle including an electric circuit for energizing the ignition of said vehicle, a normally closed switch in said circuit, and an electrically operated timing device in said circuit for operating said switch to break the circuit and stop the engine at the expiration of a predetermined period of time; the said timing device including a ratchet disc, thermostatic means for rotating said ratchet disc, a heater connected to said circuit for heating said thermostatic means, a separate switch for controlling the energization of said heater, an operating member for opening said normally closed switch, and an electro-magnet in said circuit for attaching the said operating member to the ratchet disc to cause movement of said member with the disc; the said electro-magnet being de-energizable upon the breaking of the circuit to cause the operating member to return to normal position.

5. A control system for the engine of an automotive vehicle as set forth in claim 4 including an adjustable stop for selectively adjusting the normal position of the operating member to vary the length of the time period provided by the timing mechanism.

6. A system for controlling the engine of an automotive vehicle comprising an electric circuit for energizing the ignition of said engine, a normally closed switch in said circuit, and an electrically operated timing mechanism in said circuit for controlling said switch; the said timing mechanism including a ratchet disc, a pawl for rotating said disc, a dog for preventing reverse movement of the disc, a thermostatic member for moving said pawl, a heater for actuating the thermostatic member, a switch for said heater controlled by the cooperation of said pawl and dog, an operating finger for opening the said normally closed switch to break the circuit and thereby de-energize the ignition system at the expiration of a predetermined period of time, an electro-magnet for magnetically attaching the said finger to the disc to cause movement of the finger with the disc; the said magnet being de-energizable to detach the finger from the ratchet disc, and spring means for returning the operating finger into normal position upon being detached from the ratchet disc.

7. A control system as set forth in claim 6 and including a separate switch for controlling the timing mechanism, and means operable upon initial movement of the vehicle for operating said separate switch to thereby render the timing means inoperative and upon the stopping of the vehicle to render the said timing means operative.

8. A system for controlling the engine of an automotive vehicle comprising a primary electric circuit for energizing the ignition of said engine, a secondary circuit, a normally open and manually closeable reset switch for closing said primary and secondary circuits, a relay switch in said secondary circuit in parallel with the said reset switch, an electrically operated timing device in series with said relay switch, a separate electric switch operable by the said timing device at the expiration of a predetermined period of time to break the secondary circuit and thereby open the relay switch; a control switch for independently controlling the timing device, and means responsive to movement of the vehicle for opening the said control switch.

JOHN W. MORSE.
SELWYN P. MILES.
RICHARD A. BELL.

References Cited in the file of this patent

UNITED STATES PATENTS

| Number | Name | Date |
|---|---|---|
| 393,132 | Wagner | Nov. 20, 1888 |
| 952,778 | Wohl et al. | Mar. 22, 1910 |
| 1,442,311 | Watson | Jan. 16, 1923 |
| 1,442,312 | Watson | Jan. 16, 1923 |
| 1,542,051 | Gedney | June 16, 1925 |
| 1,558,101 | Lieb | Oct. 20, 1925 |
| 1,925,781 | Taylor | Sept. 5, 1933 |
| 2,580,080 | Dewhirst | Dec. 25, 1951 |